US008621565B2

(12) United States Patent
Ohta

(10) Patent No.: US 8,621,565 B2
(45) Date of Patent: Dec. 31, 2013

(54) AUTHENTICATION APPARATUS, AUTHENTICATION METHOD AND COMPUTER READABLE INFORMATION RECORDING MEDIUM

(75) Inventor: Junn Ohta, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/476,295

(22) Filed: May 21, 2012

(65) Prior Publication Data

US 2012/0311667 A1  Dec. 6, 2012

(30) Foreign Application Priority Data

Jun. 3, 2011  (JP) ................................ 2011-124896

(51) Int. Cl.
*H04L 29/06* (2006.01)
(52) U.S. Cl.
USPC ............................................. 726/2; 713/168
(58) Field of Classification Search
USPC .................................................. 726/2; 713/168
See application file for complete search history.

(56) References Cited

U.S. PATENT DOCUMENTS

| 6,986,038 | B1 * | 1/2006 | Leah et al. ...................... 713/155 |
| 7,136,997 | B2 * | 11/2006 | Yamaguchi et al. ........... 713/155 |
| 8,146,133 | B2 * | 3/2012 | Moon et al. ......................... 726/1 |
| 2006/0090196 | A1 * | 4/2006 | van Bemmel et al. ............ 726/4 |
| 2006/0224742 | A1 * | 10/2006 | Shahbazi ...................... 709/226 |
| 2006/0242685 | A1 * | 10/2006 | Heard et al. ....................... 726/3 |
| 2007/0055871 | A1 * | 3/2007 | Ghanea-Hercock .......... 713/168 |
| 2007/0157304 | A1 * | 7/2007 | Logan et al. ..................... 726/12 |
| 2008/0005780 | A1 * | 1/2008 | Singleton .......................... 726/1 |
| 2008/0150683 | A1 * | 6/2008 | Mikan et al. ................. 340/5.31 |
| 2009/0070855 | A1 * | 3/2009 | Hori et al. .......................... 726/2 |
| 2009/0178111 | A1 * | 7/2009 | Moriconi et al. ................. 726/1 |
| 2009/0222493 | A1 * | 9/2009 | Smarr et al. ................... 707/203 |
| 2010/0043052 | A1 * | 2/2010 | Park et al. .......................... 726/1 |
| 2010/0125897 | A1 * | 5/2010 | Jain et al. .......................... 726/7 |
| 2010/0228774 | A1 * | 9/2010 | Riemers ........................ 707/770 |
| 2010/0228866 | A1 * | 9/2010 | Li et al. ......................... 709/227 |
| 2011/0202647 | A1 * | 8/2011 | Jin et al. ........................ 709/223 |
| 2011/0225625 | A1 * | 9/2011 | Wolfson et al. .................... 726/1 |

FOREIGN PATENT DOCUMENTS

| JP | 2003-296172 | 10/2003 | |
| JP | 2007328411 A | * 12/2007 | ............. G06F 15/00 |
| JP | 2011-48549 | 3/2011 | |

* cited by examiner

*Primary Examiner* — Michael Pyzocha
(74) *Attorney, Agent, or Firm* — Oblon, Spivak, McClelland, Maier & Neustadt, L.L.P.

(57) ABSTRACT

An authentication apparatus authenticates an information processing apparatus in cooperation with an external authentication apparatus. The authentication apparatus responds to a request from the information processing apparatus to carry out authentication and obtain item values, and carries out authentication for a required account; responds to the authentication being carried out, and obtains from the external authentication apparatus an item value corresponding to an item name that is set as an item to be synchronized each time; updates an item value in a local database by the obtained item value; obtains a set of item values including the updated item value; and returns to the information processing apparatus a result of the authentication having been carried out and the obtained set of item values.

7 Claims, 12 Drawing Sheets

FIG.4A

| SCHEDULED SYNCHRONIZATION ITEM |
|---|
| USER NAME |
| DISPLAY NAME |
| MAIL ADDRESS |
| FAX NUMBER |
| EXTENSION NUMBER |
| ⋮ |

FIG.4B

| EACH-TIME SYNCHRONIZATION ITEM |
|---|
| USER NAME |
| DISPLAY NAME |
| ⋮ |

FIG.4C

| TASK NAME | SCHEDULE | TASK | TARGET |
|---|---|---|---|
| PERIODIC UPDATING | EVERY TUESDAY 01:00 START | SYNCHRONIZATION EXECUTION | SCHEDULED SYNCHRONIZATION ITEMS |

FIG.4D

| SYNCHRONIZATION ITEM NAME | PRIORITY |
|---|---|
| USER NAME | HIGH |
| DISPLAY NAME | HIGH |
| MAIL ADDRESS | MEDIUM |
| FAX NUMBER | LOW |
| EXTENSION NUMBER | LOW |
| ⋮ | ⋮ |

FIG.4E

| TASK NAME | SCHEDULE | TASK | TARGET |
|---|---|---|---|
| PERIODIC UPDATING | EVERY TUESDAY 01:00 START | SYNCHRONIZATION EXECUTION | PRIORITY: LOW |
| PERIODIC UPDATING | EVERY MONDAY AND FRIDAY 01:00 START | SYNCHRONIZATION EXECUTION | PRIORITY: MEDIUM |

FIG.7A

| ITEM NAME | ITEM VALUE |
| --- | --- |
| USER NAME | USER01 |
| DISPLAY NAME | XXXTA XXRO |
| MAIL ADDRESS | xxxta@xxx.xxx.co.jp |
| FAX NUMBER | 0x-xxxx-xxxx |
| EXTENSION NUMBER | xxxx |
| ⋮ | ⋮ |

FIG.7B

| ITEM NAME | ITEM VALUE |
| --- | --- |
| USER NAME | USER01 |
| DISPLAY NAME | XXXTA XXRO |
| MAIL ADDRESS | — |
| FAX NUMBER | — |
| EXTENSION NUMBER | — |
| ⋮ | ⋮ |

FIG.7C

| ITEM NAME | ITEM VALUE |
| --- | --- |
| USER NAME | USER01 |
| DISPLAY NAME | XXXTA XXRO |
| MAIL ADDRESS | xxxta@xxx.xxx.co.jp |
| FAX NUMBER | 0x-xxxx-xxxx |
| EXTENSION NUMBER | xxxx |
| ⋮ | ⋮ |

AUTHENTICATION APPARATUS, AUTHENTICATION METHOD AND COMPUTER READABLE INFORMATION RECORDING MEDIUM

BACKGROUND OF THE INVENTION

1. Field of the Invention

The present invention relates to an authentication service, and in more detail, to an authentication apparatus, an authentication method and a computer readable information recording medium for efficiently carrying out data synchronization between authentication apparatuses.

"Data synchronization" means a process or operation of causing data existing at one place to be the same as data existing at another place, also hereinafter. Similarly, hereinafter, "data or information is synchronized" or "synchronization of data or information" means a process or operation of causing data or information existing at one place to be the same as data or information existing at another place.

2. Description of the Related Art

In the related art, in a large-scale organization, redundancy is provided concerning an authentication server by preparing one or more authentication servers in an intermediate layer with respect to a master authentication server acting as a master concerning an authentication service or a directory service. For example, in a redundant system, a configuration is provided so that a client such as a multifunction peripheral, a network apparatus or an application can receive a service from an authentication apparatus in an intermediate layer instead of directly receiving the service from a master authentication server. Thus, an increase in a speed of obtaining data, an improvement in efficiency of obtaining data and an improvement in fault tolerance are desired.

However, in such a redundant system in which plural authentication servers are provided, it is necessary to maintain consistency in information the respective authentication servers have. Therefore, it is necessary to properly carry out data synchronization between a master authentication server and an authentication server(s) in an intermediate layer.

The above-mentioned data synchronization needs to be carried out efficiently. Concerning data synchronization, various technologies are known. For example, Japanese Laid-Open Patent Application No. 2011-48549 (Patent reference No. 1) discloses a configuration whereas in order to update a data protection policy, in a case where a data protection policy concerning data that is not updated at a time of synchronization has been changed in a master computer, the data protection policy that has been changed is to be synchronized in a slave computer.

Japanese Laid-Open Patent Application No. 2003-296172 (Patent reference No. 2) discloses a document management apparatus provided for the purpose of reducing a network traffic for carrying out synchronization of a database. The document management apparatus has a detection function of detecting information that refers to an object stored in a first document management database. The document management apparatus further has a function of obtaining from the first document management database a record which the information that refers to an object refers to has been detected by the detection function, and carrying out synchronization of the record in a second document management database.

However, in data synchronization in authentication services in the related art, a method of an authentication server in an intermediate layer synchronizing data of a master authentication server is fixed, and synchronization is carried out uniformly, regardless of the degree of importance of the data, such as a required interval of synchronization. If data which does not need to be synchronized at a shortened interval is synchronized uniformly together with data having a higher degree of importance, unnecessary data traffic may be generated. Thus, data synchronization in authentication services in the related art may be insufficient from a viewpoint of efficiency of data synchronization.

The above-mentioned technologies disclosed in Patent references Nos. 1 and 2 do not consider the above-mentioned levels of intervals of synchronization required for data, and thus, may be insufficient from a viewpoint of improving efficiency of data synchronization concerning an authentication process.

SUMMARY OF THE INVENTION

According to an aspect of the embodiments, an authentication apparatus is provided which authenticates an information processing apparatus in corporation with an external authentication apparatus. The authentication apparatus includes an authentication part that authenticates a required account, in response to a request from the information processing apparatus to carry out authentication and obtain an item value; an each-time item value obtaining part that, in response to the authentication being carried out, obtains from the external authentication apparatus an item value corresponding to an item name that is set as an item to be synchronized each time; and an each-time item value updating part that updates an item value stored in a local database using an item value obtained by the each-time item value obtaining part. The above-mentioned each-time item value obtaining part and each-time item value updating part provide a synchronization mechanism of, different from an ordinary way, carrying out synchronization each time a request is given. The authentication apparatus further includes an item value set obtaining part that obtains a set of item values including an item value updated by the each-time item value updating part; and a returning part that returns to the information processing apparatus an authentication result obtained by the authentication part and the set of item values obtained by the item value set obtaining part.

According to another aspect of the embodiments, it is possible to provide a program which, when executed by one or more processors, causes the one or more processors to act as the above-mentioned respective parts and realizes an authentication apparatus that authenticates an information processing apparatus in cooperation with an external authentication apparatus. Further, according to yet another aspect of the embodiments, it is possible to provide a computer-readable recording medium that stores the above-mentioned program.

Other objects, features and advantages of the present invention will become more apparent from the following detailed description when read in conjunction with the accompanying drawings.

BRIEF DESCRIPTION OF THE DRAWINGS

FIG. 4A shows a scheduled synchronization item registration table;

FIG. 4B shows an each-time synchronization item registration table;

FIG. 4C shows a schedule managed by a task scheduler;

FIG. 4D shows a data structure of tables registering scheduled synchronization items and each-time synchronization items;

FIG. 4E shows another example of the schedule managed by the task scheduler;

FIG. 7A shows a data structure of an entry stored in a master database;

FIGS. 7B and 7C show data structures of entries stored in a local database;

DETAILED DESCRIPTION OF THE EMBODIMENT

Below, the embodiment will be described. However, it is noted that the present invention is not limited to the embodiment that will now be described. As the embodiment described below, an authentication system including a master authentication server apparatus and intermediate-layer authentication server apparatuses will be described.

Figure 1:
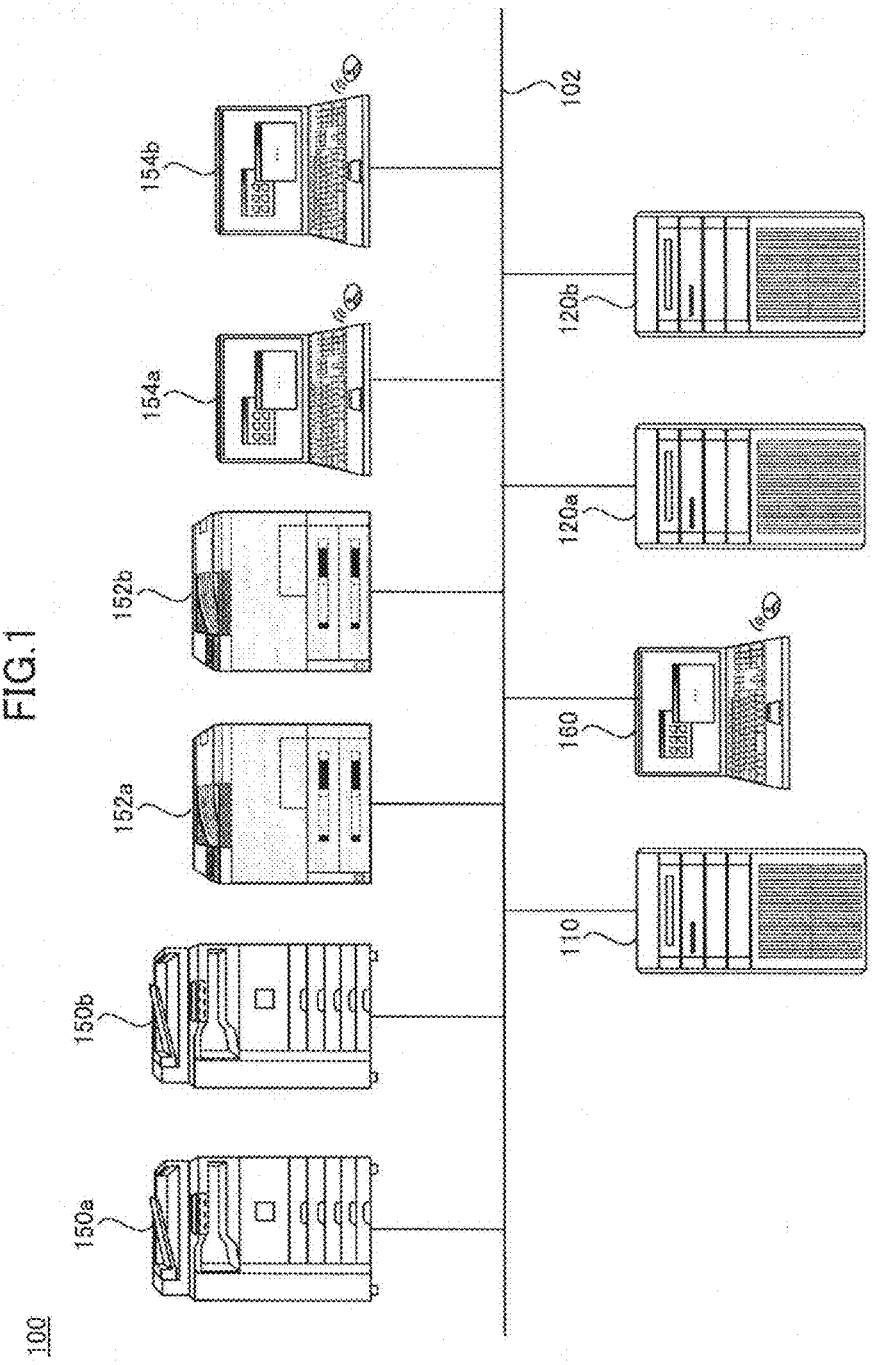
FIG. 1 is a general configuration diagram showing an authentication system according to an embodiment of the present invention.

FIG. 1 generally shows an authentication system according to the embodiment. An authentication system 100 shown in FIG. 1 includes a master authentication server apparatus 110, one or more intermediate-layer authentication server apparatuses 120 (for example, 120a and 120b in FIG. 1), one or more plural apparatuses 150 through 154 (for example, 150a, 150b, 152a, 152b, 154a and 154b in FIG. 1) acting as clients of authentication services, and a management terminal 160. These apparatuses 110, 120, 150 through 154 and 160 are mutually connected by a communication network 102.

The master authentication server apparatus 110 and the intermediate-layer authentication server apparatuses 150 through 154 have server functions of providing authentication services or directory services to the clients. As protocol(s) of authentication services or directory services, a Lightweight Directory Access Protocol (LDAP) or the like may be a typical one. Further, other than this, a known general-purpose protocol or a unique protocol may be used for the same purpose.

The master authentication server apparatus 110 has master data of account information including authentication information and directory information. In response to account authentication requests from the apparatuses 150 through 154 acting as the clients, the master authentication server apparatus 110 can carry out account authentication using the account information, and provide information. Adding, changing and deleting of the account information is carried out on the master data of the master authentication server apparatus 110. It is noted that the master authentication server apparatus 110 acts as an external authentication apparatus in the embodiment.

The intermediate-layer authentication server apparatuses 120 have replica data of the master data that resides on the master authentication server apparatus 110. Instead of the master authentication server apparatus 110, the intermediate-layer authentication server apparatuses 120 receive authentication requests from the apparatuses 150 through 154 as the clients, and carry out account authentication in cooperation with the master authentication server apparatus 110. Data synchronization of the account information is timely carried out between the intermediate-layer authentication server apparatuses 120a and 120b and the master authentication server apparatus 110 using data synchronization mechanisms in the embodiment described later in detail. Thereby, load distribution (or load sharing), an increase in speed, and providing redundancy of services can be achieved. It is noted that the intermediate-layer authentication server apparatuses 120 act as authentication apparatuses that authenticate an information processing apparatus (i.e., the clients) in cooperation with the above-mentioned external authentication apparatus, in the embodiment.

The apparatuses 150 through 154 as the clients, i.e., multifunction peripherals 150 (150a, 150b), printers 152 (152a, 152b) and personal computers 154 (154a, 154b), are apparatuses as the clients that receive the above-mentioned authentication services or directory services. Hereinafter, these apparatuses 150 through 154 (150a, 150b, 152a, 152b, 154a, 154b) may be generally referred to as clients 150 through 154. The clients 150 through 154 receive account authentication information such as user names, passwords, IC authentication card information and/or the like that are input by the users of the respective clients, and request the server apparatuses 110 or 120 to carry out authentication processes. One of the master authentication server apparatus 110 and the one or more intermediate-layer authentication server apparatuses 120 is not limited, which the clients 150 through 154 request to carry out authentication processes. Main authentication request targets may be previously determined for the respective clients, or a configuration may be provided such that a load balancer or the like is used and given authentication requests may be appropriately distributed to or shared by the master authentication server apparatus 110 and the one or more intermediate-layer authentication server apparatuses 120.

As the clients, FIG. 1 illustrates the multifunction peripherals 150a, 150b, printers 152a, 152b and personal computers 154a, 154b as examples, and the clients are not limited thereto. As the clients, various information processing apparatuses in which applications that access authentication services operate may be adopted, such as general-purpose computer apparatuses such as workstations, servers or the like; portable information terminals such as smartphones, Personal Digital Assistances (PDA), or the like; image communication apparatuses such as facsimile (fax) machines, and so forth. Further, the number of clients are not particularly limited, and may be one or more.

The management terminal 160 remotely accesses the master authentication server apparatus 110, and carries out adding, changing, deleting or the like of the account information. Further, the management terminal 160 remotely accesses the intermediate-layer authentication server apparatuses 120, and is used to carry out various settings concerning data synchronization.

The communication network 102 is not particularly limited, and may be configured as a Local Area Network (LAN) or a Virtual Private Network (VPN) using a transaction protocol such as Ethernet (registered trademark), Transmission Control Protocol/Internet Protocol (TCP/IP) or the like, a Wide Area Network (WAN) connected using a private line, or the like.

Figure 2:
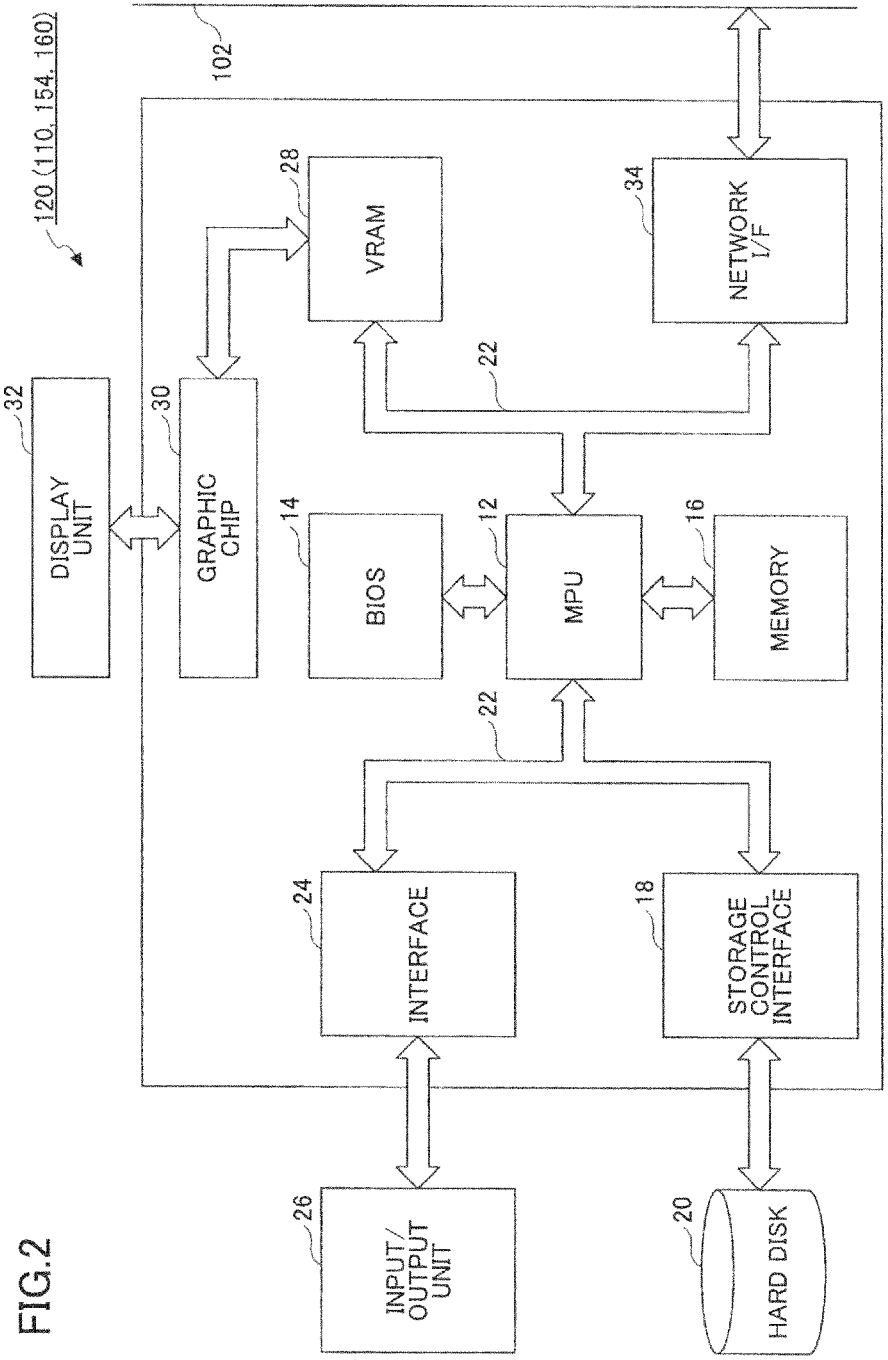
FIG. 2 is a hardware configuration diagram of an intermediate-layer authentication server apparatus according to the embodiment.

FIG. 2 shows a hardware configuration of the intermediate-layer authentication server apparatuses 120 according to the embodiment. As shown in FIG. 2, each of the intermediate-layer authentication server apparatuses 120 includes a microprocessor unit (MPU) 12, a non-volatile memory 14 storing a Basic Input Output System (BIOS), and a memory 16 providing an execution storage space enabling a program process to be carried out by the MPU 12. The MPU 12 reads the BIOS from the non-volatile memory 14 at a time of starting up, and carries out system diagnosis and also management of an input/output unit 26.

The MPU 12 is connected with a storage control interface 18 via an internal bus 22. As the storage control interface 18, an interface may be used which manages input/output of a hard disk drive 20 according to a standard such as Integrated Device Electronics (IDE), AT Attachment (ATA), SATA, eSATA or the like. The hard disk drive 20 carries out writing or reading data in response to an input/output request from the MPU 12. It is noted that according to the embodiment, the hard disk drive 20 provides a storage area of a local database 122 (see FIG. 3) which stores account information.

Further, the MPU 12 can control a serial or parallel interface 24 of USB, IEEE1164 or the like via the internal bus 22 and communicates with the input/output unit 26 such as a keyboard, a mouse, a printer and/or the like, and receive an input from the user.

The intermediate-layer authentication server apparatus 120 may further include a VRAM 28 and a graphic chip 30. The graphic chip 30 responds to an instruction given by the MPU 12, processes a video signal, and displays the video signals on a display unit 32. An administrator of the authentication system 100 can carry out various settings to the intermediate-layer authentication server apparatus 200 using a console (not shown) via the display unit 32 and the input/output unit 26.

Further, the MPU 12 is connected with a network I/F (Network Interface Card (NIC)) 34 via the internal bus 22. Thereby, the intermediate-layer authentication server apparatus 120 can communicate with external apparatuses such as the clients 150 through 154, the management terminal 160 and/or the like, via the communication network 102. Further, the administrator can remotely carry out various settings to the intermediate-layer authentication server apparatus 120 via the network I/F 34.

The intermediate-layer authentication server apparatus 120 reads a program (not shown) stored in a storage unit such as the non-volatile memory 14 or the hard disk drive 20, and expands the read program in a memory area of a memory 16. Thereby, the intermediate-layer authentication server apparatus 120 can act as respective parts and carry out respective processes described later under the control of a proper operating system (OS). As the OS, an OS having any architecture such as Windows (registered trademark), UNIX (registered trademark), LINUX (registered trademark) or the like may be used.

It is noted that although detailed description will be omitted, each of the master authentication server apparatus 110, the personal computers 154 as the clients and the management terminal 160 in the embodiment may have the same configuration as the hardware configuration shown in FIG. 2. In this case, a component(s) may be added to or removed from the hardware configuration depending on a specific purpose. As for the multifunction peripherals 150 and 152, although description of detailed hardware configurations thereof will be omitted, any known hardware configurations may be adopted.

Figure 3:
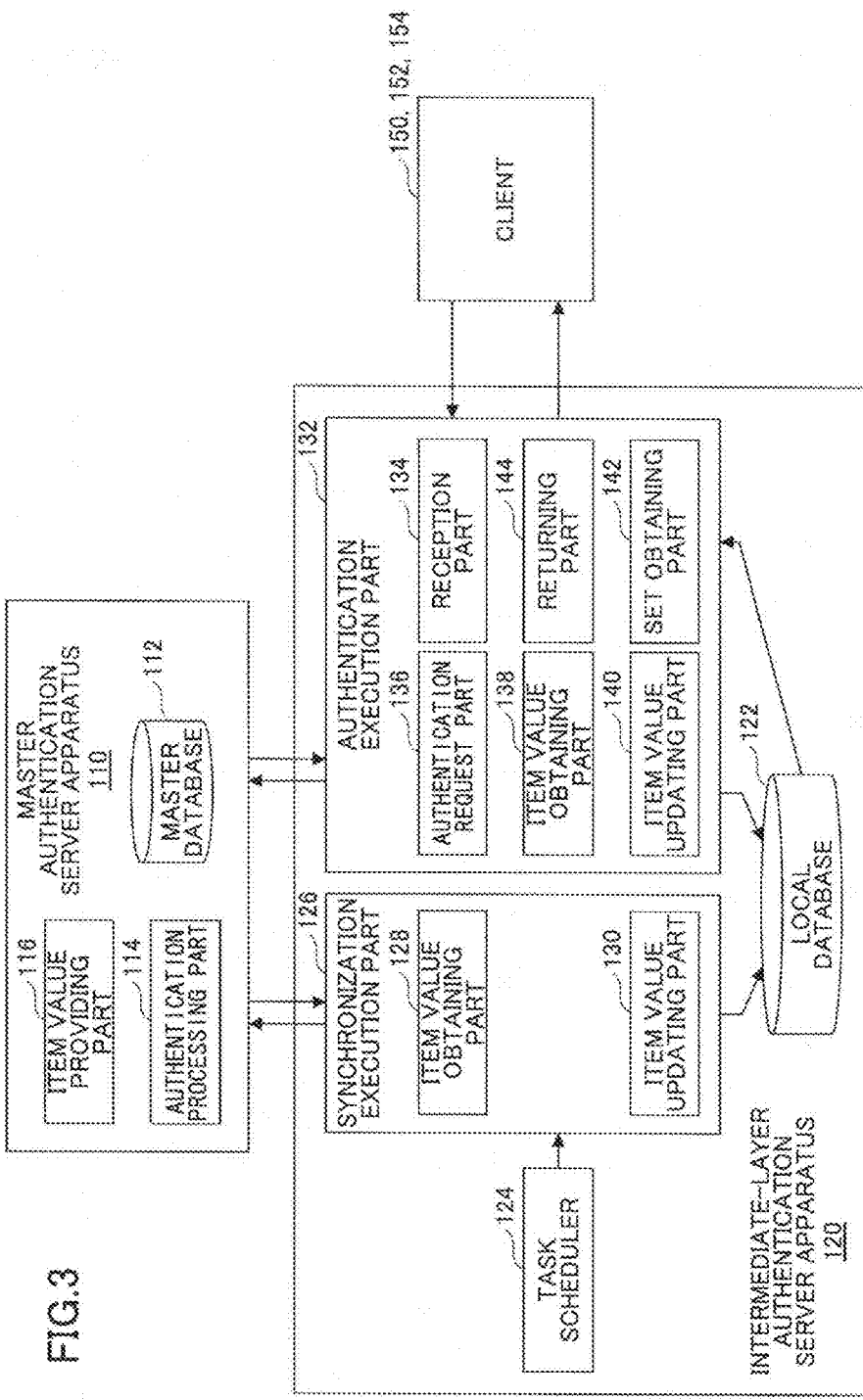
FIG. 3 is a functional block diagram of the authentication system according to the embodiment.

Below, using FIGS. 3, 4A, 4B, 4C, 4D, 4E, 5, 6 7A, 7B and 7C, data synchronization processes carried out between the master authentication server apparatus 110 and the intermediate-layer authentication server apparatuses 120 according to the embodiment will be described. FIG. 3 is a functional block diagram of the authentication system 100 according to the embodiment. FIG. 3 shows functional blocks realized in the master authentication server apparatus 110 and functional blocks realized in each of the intermediate-layer server apparatuses 120.

As shown in FIG. 3, the master authentication server apparatus 110 includes a master database 112, an authentication processing part 114 and an item value providing part 116. The master database 112 is a database that stores master data of account information. The master debase 112 is provided in a permanent storage area such as that provided in the hard disk drive 20.

The authentication processing part 114 is a functional part that receives requests from the intermediate-layer authentication server apparatuses 120, carries out account authentication, and returns authentication results, in a case where the intermediate-layer authentication server apparatuses 120 deal with authentication requests received from the clients 150 through 154. The item value providing part 116 is a functional part that provides account information to the intermediate-layer authentication server apparatuses 120 for the purpose of carrying out data synchronization with the intermediate-layer authentication server apparatuses 120.

It is noted that FIG. 3 mainly indicates functional blocks concerning data synchronization started from the intermediate-layer authentication server apparatuses 200. Therefore, it is to be noted that functional blocks used when the master authentication server apparatus 120 itself receives authentication requests from the clients 150 through 154 and carries out account authentication have been omitted from FIG. 3.

Referring to the functional blocks of the intermediate-layer authentication server apparatus 120 shown in FIG. 3, each intermediate-layer authentication server apparatus 120 includes a local database 122, a task scheduler 124, a synchronization execution part 126 and an authentication execution part 132. The local database 122 includes the above-mentioned replica of the master data stored in the master database 112, and is a database which the intermediate-layer authentication server apparatus 120 can directly access. The local database 122 is provided in a permanent storage area such as that provided in the hard disk drive 20 shown in FIG. 2 or the like.

According to the embodiment, data synchronization concerning authentication services or directory services is carried out using at least two data synchronization mechanisms. The task scheduler 124 and the synchronization execution part 126 act as a functional part for realizing a first data synchronization mechanism. The task scheduler 124 manages a schedule of carrying out data synchronization carried out by the first data synchronization mechanism. The task scheduler 124 calls the synchronization execution part 126 regularly or irregularly according to a previously set schedule. The synchronization execution part 126 carries out a data synchronization process according to the schedule in response to being called by the task scheduler 124.

In more detail, as shown in FIG. 3, the synchronization execution part 126 includes an item value obtaining part 128 and an item value updating part 130. Item values may include various sorts of information to be provided to the clients such as a user name, a user display name, an electronic mail address, a fax number, a fixed-line phone number, an IP telephone number, an office telephone number, a home telephone number, a group membership, a public key, an employee number, an office address, a residence address, a photograph, an access control information and/or the like which are provided to the clients 150 through 154 by the authentication server apparatuses 110 and/or 120. Other than these, as item values to be synchronized, authentication information such as a password, IC card authentication data, biometric authentication data and/or the like may be included. Below, the item value obtaining part 128 and the item value updating part 130 included in the synchronization execution part 126 for carrying out data synchronization according to a schedule (such as that mentioned above) will be referred to as a "scheduled item value obtaining part" 128 and a "scheduled item value updating part" 130, respectively.

The scheduled item value obtaining part 128 requests the master authentication server apparatus 110 to obtain item values of items that are previously set as those to undergo data synchronization according to a schedule, and obtains the item values. Below, items that are previously set as those to undergo data synchronization according to a schedule will be referred to as "scheduled synchronization items". Usually, scheduled synchronization items may be data having low necessity in authentication processes required by the clients, and data that does not influence a determination of use authority may be cited as an example, such as an electronic mail address, a fax number, a telephone number and/or the like. The scheduled item value updating part 130 updates replica data included in the local database 122 by the item values of respective scheduled synchronization items that the scheduled item value obtaining part 128 has obtained.

FIG. 4A shows a data structure of a scheduled synchronization item registration table that registers scheduled synchronization items which are previously set. FIG. 4C shows a data structure of a schedule that the task scheduler 124 according to the embodiment manages. The schedule shown in FIG. 4C prescribes that at 1:00 a.m. every Tuesday, the synchronization execution part 126 is called and data synchronization is carried out for the item values of the scheduled synchronization items as synchronization targets.

It is noted that for the purpose of convenience of explanation, it is assumed that according to the embodiment, the first data synchronization mechanism obtains the item values of all the scheduled synchronization items of all the accounts from the master authentication server apparatus 110, and carries out updating in an overwriting manner. However, from a viewpoint of reducing unnecessary network traffic, it is preferable to synchronize only entries of accounts for which adding, changing or deleting has been carried out as differences between the master database 112 and the local database 122 using an attribute such as date and time of updating entries.

In contrast thereto, the authentication execution part 132 is a functional part that realizes a second data synchronization mechanism. The authentication execution part 132 receives authentication requests from the clients 150 through 154, carries out account authentication in cooperation with the master authentication server apparatus 110, and carries out data synchronization each time for the accounts concerning the requests.

In more detail, as shown in FIG. 3, the authentication execution part 132 includes a reception part 134, an authentication request part 136, an item value obtaining part 138, an item value updating part 140, a set obtaining part 142 and a returning part 144. Below, the item value obtaining part 138 and the item value updating part 140 in the authentication execution part 132 for carrying out data synchronization each time an authentication request is given will be referred to as an each-time item value obtaining part 138 and an each-time item value updating part 140, respectively.

The reception part 134 receives an authentication request and an item value obtaining request from any one of the clients 150 through 154. The authentication request includes the user authentication information such as the user name, the password, the IC authentication data and/or the like of the user who has logged in to the corresponding one of the clients 150 through 154.

The authentication request part 136 responds to the reception part 134 having received the authentication request and the item value obtaining request, transmits the above-mentioned user authentication information and requests the master authentication server apparatus 110 to carry out an authentication process. Further, along with the request to carry out the authentication process, the authentication request part 136 requests the master authentication server apparatus 110 to obtain the item values of the account concerning the authentication request for the items that are set as those to undergo data synchronization each time an authentication request is given, and obtains the authentication result and the required item values. Hereinafter, items that are set as those to undergo data synchronization each time when an authentication request is given will be referred to as "each-time synchronization items". The each-time item value updating part 140 updates replica data included in the local database 122 by the item values of the respective each-time synchronization items that the each-time item value obtaining part 138 has obtained.

It is noted that it is assumed that according to the embodiment, the authentication request part 136 requests the master authentication server apparatus 110 to carry out an authentication process. However, according to an embodiment in which user authentication information is also to undergo data synchronization, the intermediate-layer authentication server apparatus 120 may carry out account authentication inside. The authentication request part 136 acts as an authentication part that responds to an authentication request given by the client and carries out authentication for the required account by requesting the external master authentication server apparatus 110 to do so or by itself.

FIG. 4B shows a data structure of an each-time synchronization item registration table that registers each-time synchronization items that are previously set. Each-time synchronization items are those to undergo data synchronization each time an authentication request is given, and it is preferable to set, as each-time synchronization items, data having high necessity in an authentication process required by the client and for which high consistency is required. As each-time synchronization items, data that influences a determination of use authority may be cited as an example, such as the name and/or identification of the user, the name and/or identification of the group to which the user belongs, the access authority information, and/or the like.

It is noted that it is assumed that according to the embodiment, the second data synchronization mechanism obtains the item values of all the each-time synchronization items for the account for which authentication is required, and carries out updating in an overwriting manner. However, from a viewpoint of reducing unnecessary network traffic, it is preferable to actually carry out synchronization only when differences occur between the master database 112 and the local database 122, using an attribute such as date and time of updating the entry of the account.

In a case where the authentication has succeeded, the set obtaining part 142 obtains a set of necessary item values of the entry of the account from the local database 122 for the purpose of returning required information to the corresponding one of the clients 150 through 154. The returning part 144 returns the authentication result and the set of item values that the set obtaining part 142 has obtained to the corresponding one of the clients 150 through 154, as a response to the authentication request and the item value obtaining request.

It is noted that as described above, according to the embodiment, account information is separated into two groups, i.e., scheduled synchronization items and each-time synchronization items, and data synchronization is carried out for the respective item groups using the two different data synchronization mechanisms (i.e., the first and second data synchronization mechanisms). However, separation of account information is not limited to the way of separation into the above-mentioned two groups. Account information may be separated into three or more levels such as priorities of "high", "medium" and "low" as illustrated in FIG. 4D, for example. In this case, account information may be separated into each-time synchronization items and plural groups of scheduled synchronization items that are synchronized according to respective plural different schedules, and the respective schedules may be set for the plural groups of scheduled synchronization items, as shown in FIG. 4E.

Figure 5:
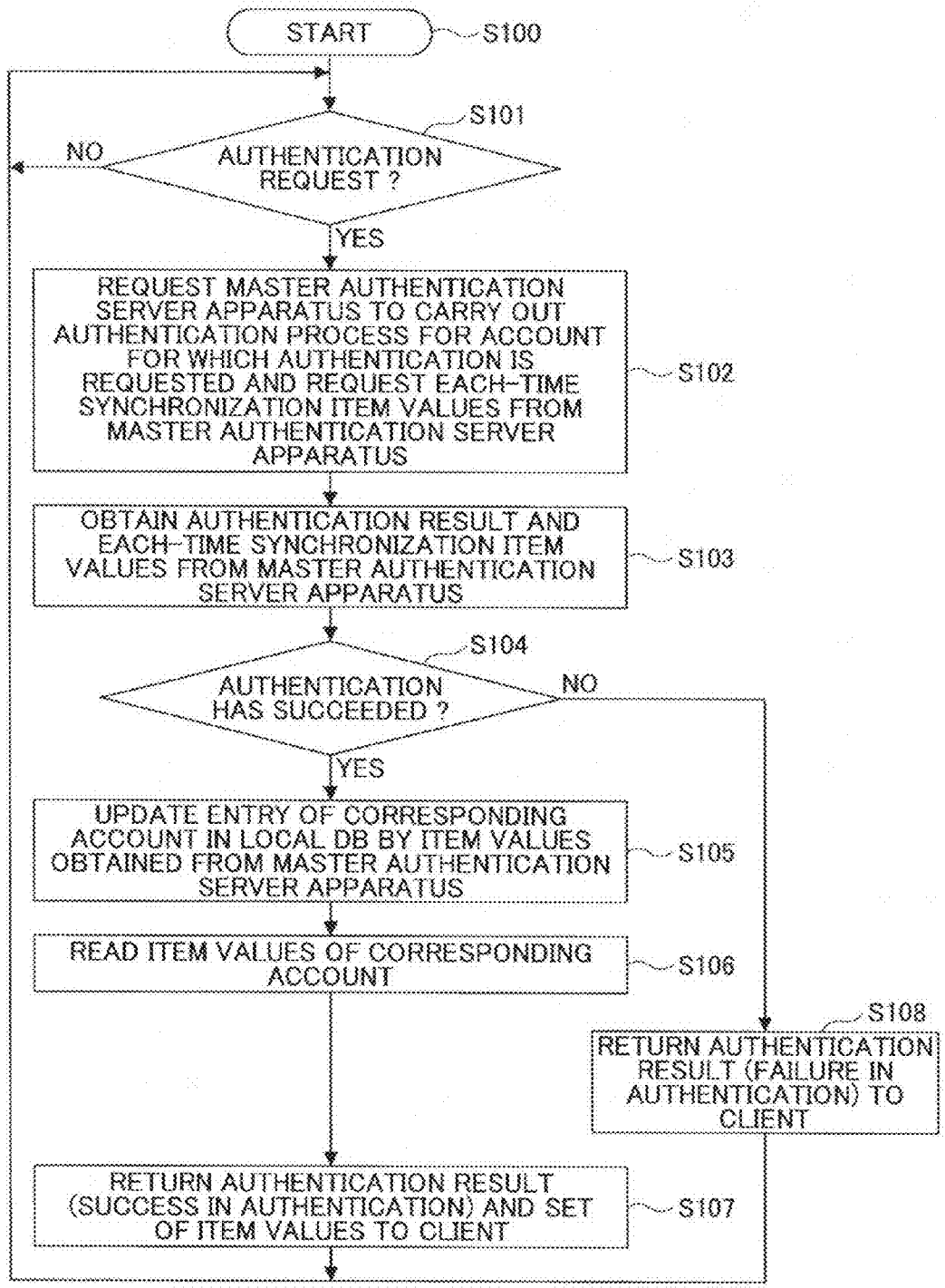
FIG. 5 is a flowchart showing a data synchronization process carried out at a time an authentication request is given, which process is carried out by an intermediate-layer authentication server apparatus according to the embodiment.

Below, using FIGS. 5, 6, 7A, 7B and 7C, a data synchronization process carried out in the embodiment will be described in detail in such a manner that the intermediate-layer authentication server apparatus 120 acts as a subject. FIG. 5 is a flowchart showing a data synchronization process at a time an authentication request is given carried out by the intermediate-layer authentication server apparatus 120 according to the embodiment. A process shown in FIG. 5 is started from step S100 in response to the intermediate-layer authentication server apparatus 120 starting an authentication service or a directory service.

In step S101, the reception part 134 of the intermediate-layer authentication server apparatus 120 determines whether the reception part 134 has received an authentication request from any one of the clients 150 through 154. In a case where it has been determined that no authentication request has been received (step S101 NO), step S101 is carried out repetitively in a loop manner and an authentication request is waited for. On the other hand, in a case where it has been determined that an authentication request has been received from any one of the clients 150 through 154 (step S101 YES), the process proceeds to step S102.

In step S102, the authentication request part 136 of the intermediate-layer authentication server apparatus 120 requests the master authentication server apparatus 110 to carry out an authentication process for the account for which authentication is thus required, and makes a request to obtain the each-time synchronization items for the account from the master authentication server apparatus 110. The authentication processing part 114 of the master authentication server apparatus 110 reads the master database 112 and carries out an authentication process for the required account. In a case where the authentication processing part 114 has succeeded in the authentication, the item value providing part 116 of the master authentication server apparatus 110 reads the entry of the account and returns the required each-time synchronization items to the intermediate-layer authentication server apparatus 120.

In step S103, the each-time item value obtaining part 138 of the intermediate-layer authentication server apparatus 120 obtains the authentication result and the item values of the each-time synchronization items from the master authentication server apparatus 110. The authentication result includes a result indicating whether the authentication has succeeded or failed.

In step S104, the intermediate-layer authentication server apparatus 120 selects one of branches of the process flow depending on whether the authentication has succeeded or failed. In a case where it has been determined that the authentication has succeeded (step S104 YES), the process proceeds to step S105. In step S105, the each-time synchronization item value updating part 140 of the intermediate-layer authentication server apparatus 120 updates the entry of the account in the local database by the item values obtained from the master authentication server apparatus 110.

For example, in a case where the entry shown in FIG. 7A is included in the master database 112 while on the other hand, no account information for "USER01" exists in the local database 122 of the intermediate-layer authentication server apparatus 120, the entry shown in FIG. 7B is to be registered in the local database 122. FIG. 7B illustrates a case where the items shown in FIG. 4B are set as each-time synchronization items. As shown in FIG. 7B, in this stage, the item values other than user name and display name of the entry are in a blank state.

In step S106, the set obtaining part 142 of the intermediate-layer authentication server apparatus 120 reads from the local database 122 at least the set of item values required to return to the corresponding one of the client 150 through 154. It is noted that the description will be made assuming that the set of all the item values of the entry are returned. In step S107, the returning part 144 of the intermediate-layer authentication server apparatus 120 returns the authentication result indicating that the authentication has succeeded and the set of item values to the corresponding one of the clients 150 through 154 as a response to the authentication request and the item value obtaining request, the process then proceeds to step S101 in a loop manner, and a next authentication request is waited for.

According to the example of FIGS. 7A and 7B, the set of item values are returned to the corresponding one of the clients 150 through 154 in a state where the item values of user name and display name are included and the item values such as mail address and fax number other than the each-time synchronization items are left blank (NULL).

On the other hand, in a case where it has been determined that the authentication has failed (step S104 NO), the process proceeds to step S108. In step S108, the returning part 144 of the intermediate-layer authentication server apparatus 120 returns to the corresponding one of the clients 150 through 154 indicating that the authentication has failed. In this case, no set of item values are returned.

Figure 6:
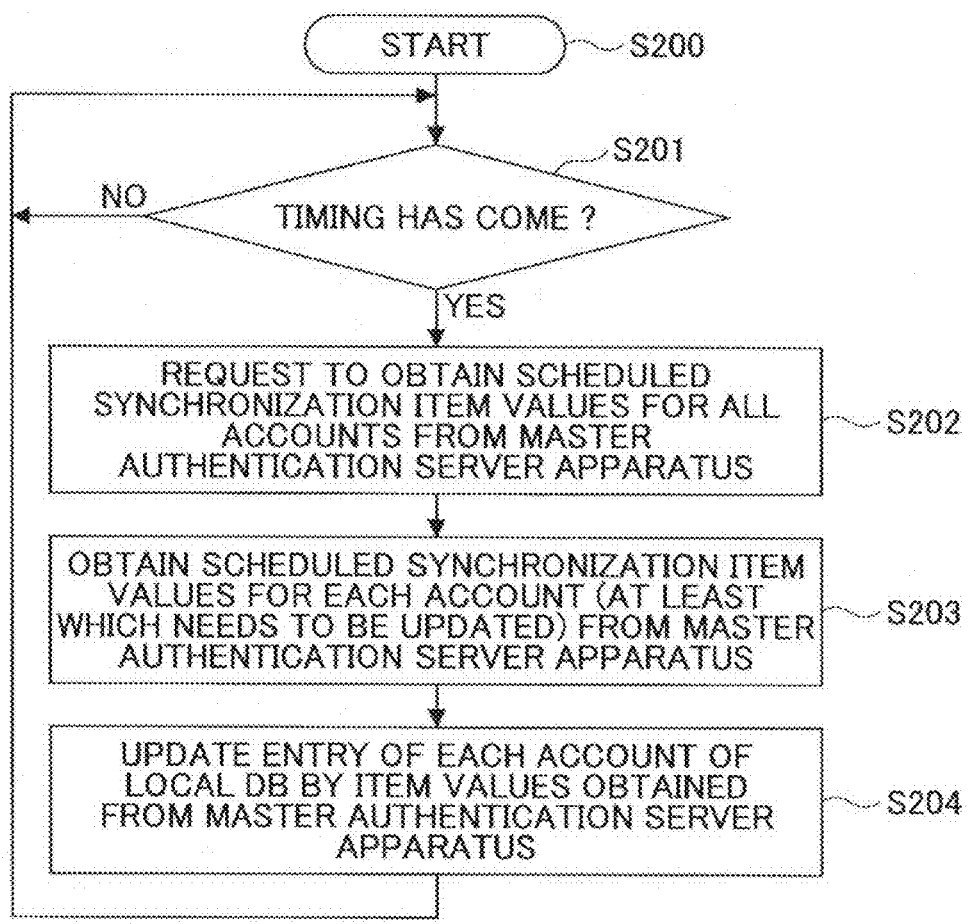
FIG. 6 is a flowchart showing a data synchronization process according to a schedule, which process is carried out by the intermediate-layer authentication server apparatus according to the embodiment.

FIG. 6 is a flowchart of a data synchronization process that is carried out according to a schedule by the intermediate-layer authentication server apparatus 120 according to the embodiment. The process shown in FIG. 6 is started by the intermediate-layer authentication server apparatus 120, and is started from step S200 in response to the task scheduler 124 being started up.

In step S201, the task scheduler 124 of the intermediate-layer authentication server apparatus 120 determines whether timing prescribed in the schedule has come. In a case where it has been determined that the timing has not come yet (step S201 NO), step S201 is repeated in a loop manner and the timing is waited for. On the other hand, in a case where it has been determined that the timing has come (step S201 YES), the process proceeds to step S202.

In step S202, the scheduled synchronization item value obtaining part 128 of the intermediate-layer authentication server apparatus 120 makes a request to obtain the scheduled synchronization items for all the accounts from the master authentication server apparatus 110. In step S203, the scheduled synchronization item value obtaining part 128 of the intermediate-layer authentication server apparatus 120 obtains the item values of the scheduled synchronization items from the master authentication server apparatus 110. In step S204, the scheduled synchronization item value updating part 140 of the intermediate-layer authentication server apparatus 120 updates the entries of the corresponding accounts of the local database 122 by the item values thus obtained from the master authentication server apparatus 110. Then, the process proceeds to step S201 in a loop manner and the next timing is waited for.

By the above-described data synchronization according to the schedule, data synchronization is carried out for the item values including those of the each-time synchronization items and the scheduled synchronization items. In a case where an authentication request is given after the data synchronization process described above using FIG. 6 has been carried out, the set of item values including all the item values shown in FIG. 7C are returned to the corresponding one of the clients 150 through 154, according to the example of FIGS. 7A and 7B, and assuming that the items shown in FIG. 4A are set as the scheduled synchronization items.

Below, using FIGS. 8 and 9, functions of setting item values of each-time synchronization items and item values of scheduled synchronization items will be described. According to the embodiment, a configuration is provided such that item values of each-time synchronization items and item values of scheduled synchronization items can be previously set from a local console (not shown) of the intermediate-layer authentication server apparatus 120 or remotely from the management terminal 160.

Figure 8:
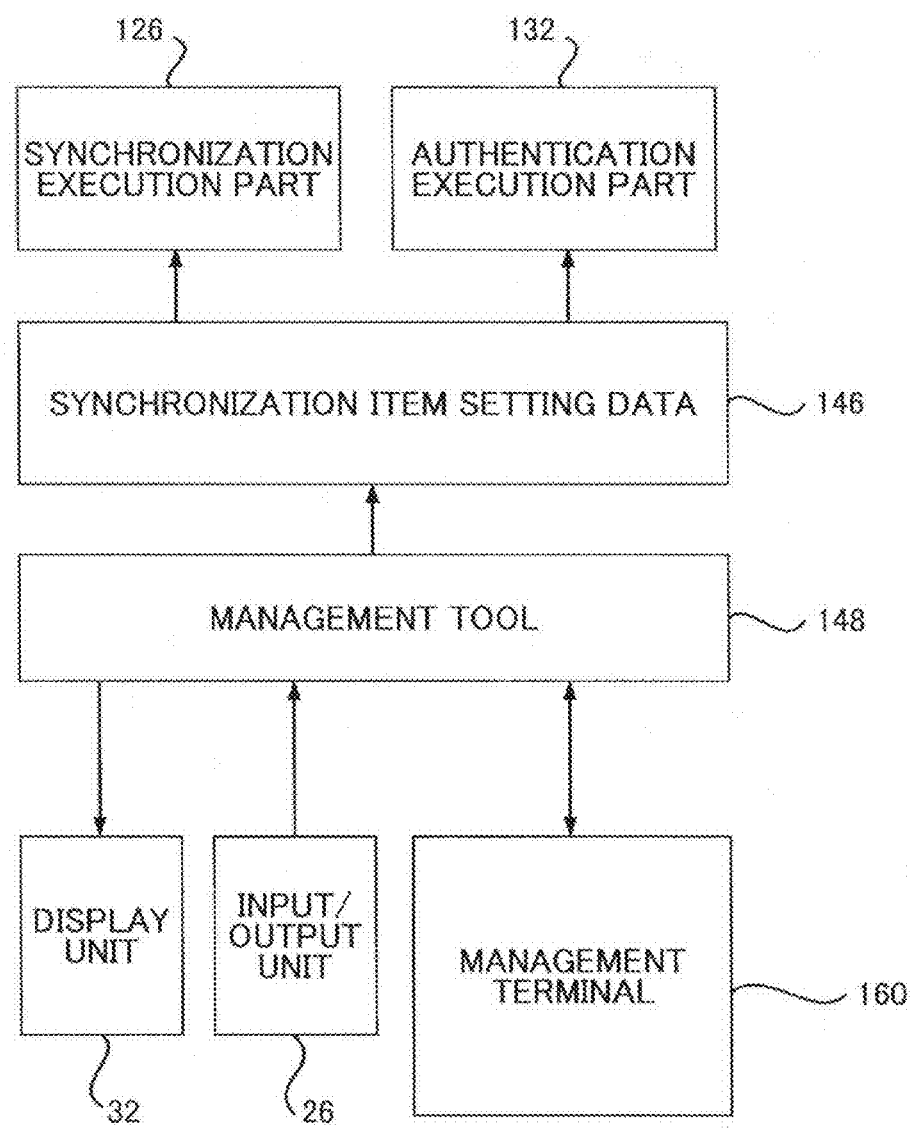
FIG. 8 is a functional block diagram concerning functions of setting each-time synchronization items and scheduled synchronization items according to the embodiment.

FIG. 8 is a functional block diagram concerning functions of setting item values of each-time synchronization items and item values of scheduled synchronization items according to the embodiment. As shown in FIG. 8, the intermediate-layer authentication server apparatus 120 further includes a synchronization item setting data 146 that the synchronization execution part 126 and the authentication execution part 132 read, and a management tool 148 for editing the synchronization item setting data 146.

The synchronization item setting data 146 is data that specifies each-time synchronization items and scheduled synchronization items. The management tool 148 is a functional part that provides a Graphical User Interface (GUI) for editing the synchronization item setting data 146 from the local console of the intermediate-layer authentication server apparatus 120 using the display unit 32 and the input/output unit 26 or from the external management terminal 160 that is remotely connected with the management tool 148. The management tool 148 may be configured as a web server to publicize a management screen page as a web page in a specific embodiment.

Figure 9:
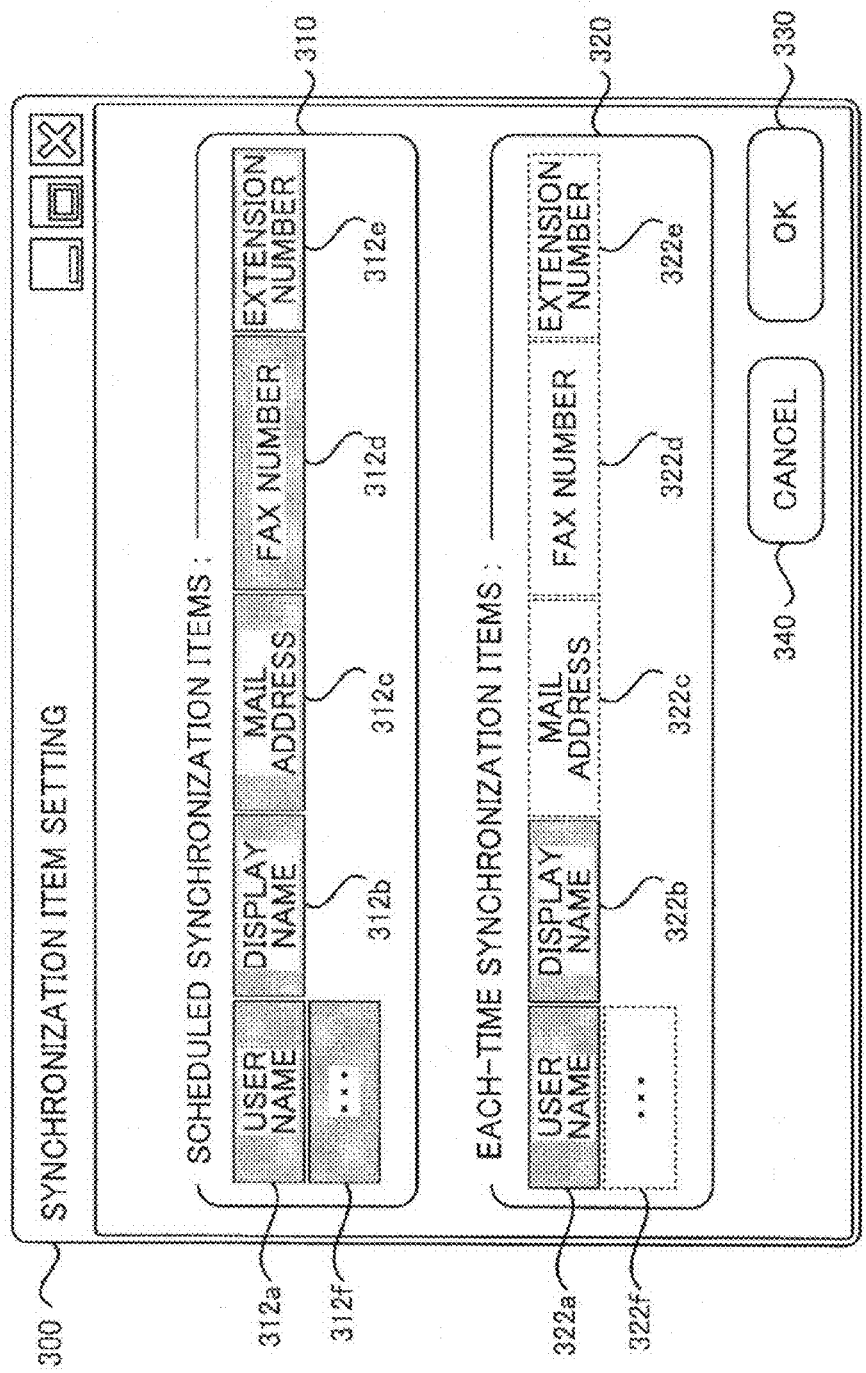
FIG. 9 illustrates a management screen page for setting synchronization item setting data according to the embodiment.

FIG. 9 illustrates the management screen page for setting the synchronization item setting data 146 according to the embodiment. The management screen page 300 shown in FIG. 9 includes an area 310 for setting "scheduled synchronization items", an area 320 for setting "each-time synchronization items", a button 330 for reflecting the setting, and a button 340 for cancelling the contents that have been set.

The areas 310 and 320 have selection buttons 312a through 312f and selection buttons 322a through 322f, respectively, for setting the respective items included in each set of account information as scheduled synchronization items or each-time synchronization items. In FIG. 9, highlighted (or dark) buttons indicate that these are currently selected as scheduled synchronization items or each-time synchronization items. In the management screen page 300 shown in FIG. 9, when the button 330 is clicked in a state where scheduled synchronization items and each-time synchronization items have been selected, the contents that have thus been set are reflected in the synchronization item setting data 146.

As described above, according to the embodiment, when an intermediate-layer authentication server apparatus carries out data synchronization with an external master authentication server apparatus, account information is separated into plural levels, and plural synchronization mechanisms are provided corresponding to the respective levels. By this configuration, information in one level may be synchronized each time in response to a service request being given by a client, and on the other hand, information in another level may be synchronized according to a schedule. For example, a configuration may be provided such that data having low necessity in an authentication process required by a client may undergo data synchronization according to a schedule, and on the other hand, data having high necessity in an authentication process required by a client may undergo data synchronization each time an authentication request is given.

As described above, it is possible to carry out data synchronization at a frequency and timing depending on importance of data. Therefore, it is possible to avoid superfluous generation of network traffic, reduce a processing cost of a synchronization process, and also, maintain consistency between master data and replica data at an adequate level. Furthermore, it is possible to achieve both the quality of data that is synchronized and the efficiency of a synchronization process.

As described above, according to the embodiment, it is possible to provide an authentication apparatus, a program and a recording medium by which it is possible to achieve high efficiency and high quality data synchronization by carrying out, in appropriate timing, data synchronization of information having plural levels of different required synchronization intervals of time, using proper synchronization mechanisms, concerning data synchronization between an authentication apparatus that carries out authentication of an information processing apparatus in cooperation with an external authentication apparatus and the external authentication apparatus.

It is noted that the above-mentioned functional parts may be realized by a program(s) that is(are) described by a legacy programming language such as assembler, C, C++, C#, Java (registered trademark) or the like, an object-oriented programming language, or the like, and can be executed by a computer. The program may be distributed in a state of being stored in a computer readable recording medium such as a ROM, an EEPROM, an EPROM, a flash memory, a flexible disk, a CD-ROM, a CD-RW, a DVD-ROM, a DVD-RAM, a DVD-RW, a blu-ray disc, a SD card, a magneto-optical disc (MO) or the like, or via communication lines.

The above-described embodiment has been devised in consideration of the above-mentioned insufficient point of the related art, and an object of the embodiment is to provide an authentication apparatus, an authentication method and a computer readable information recording medium, by which it is possible to carry out high quality data synchronization at high efficiency by carrying out, in appropriate timing, synchronization of information having plural levels of different required intervals of synchronization, using proper data synchronization mechanisms, concerning data synchronization between an authentication apparatus that authenticates an information processing apparatus in cooperation with an external authentication apparatus and the external authentication apparatus.

According to the configuration of the embodiment, when the authentication apparatus carries out data synchronization with the external authentication apparatus, a data synchronization mechanism is provided separately for synchronizing an item each time in response to a request being given. The item is separated to be synchronized each time from among information to be provided to the information processing apparatus. Thereby, it is possible to synchronize information of one level each time in response to a service request being given by the client (i.e., the information processing apparatus), and carry out synchronization using the data synchronization mechanism different from a data synchronization mechanism provided for information of another level. Thereby, it is possible to maintain the quality of data being synchronized and also the efficiency of data synchronization.

Although the embodiment of the authentication apparatus has been described above, the present invention is not limited to the embodiment, and changes such as adding, changing, deleting and/or the like may be made therein or another embodiment may be provided within a scope that may be envisaged by a person skilled in the art. Any embodiments are included in the scope of the present invention as long as they carry out functions and effects of the present invention.

The present application is based on Japanese Priority Application No. 2011-124896 filed Jun. 3, 2011, the entire contents of which are hereby incorporated herein by reference.

What is claimed is:

1. An authentication apparatus including a processor coupled with a memory that authenticates an information processing apparatus in cooperation with an external authentication apparatus, the authentication apparatus comprising:
   an authentication part that responds to a request from the information processing apparatus to carry out authentication and obtain item values, and carries out authentication for a required account;
   an each-time item value obtaining part that responds to the authentication being carried out and obtains from the external authentication apparatus an item value corresponding to an item name that is set as an item to be synchronized each time;
   an each-time item value updating part that updates an item value included in a local database by the item value obtained by the each-time item value obtaining part;
   an item value set obtaining part that obtains a set of item values including the item value updated by the each-time item value updating part;
   a returning part that returns to the information processing apparatus an authentication result obtained from the authentication part and the set of item values obtained by the item value set obtaining part;
   a scheduled item value obtaining part that obtains from the external authentication apparatus an item value corresponding to an item name that is set to be synchronized according to a schedule; and
   a scheduled item value updating part that updates an item value included in the local database by the item value obtained by the scheduled item value obtaining part,
   wherein:
   the set of item values obtained by the item value set obtaining part further include the item value updated by the scheduled item value updating part, and
   one or more priorities are set to the items to be synchronized according to the schedule, and synchronization processes of the items to be synchronized according to the schedule are carried out periodically at one or more updating intervals that are set according to the one or more priorities, respectively.

2. The authentication apparatus as claimed in claim 1, further comprising:
   a management tool that provides a management interface for setting the item to be synchronized each time and the item to be synchronized according to the schedule.

3. The authentication apparatus as claimed in claim 1, wherein
   the each-time item value obtaining part uses date and time at which the item value corresponding to the item name that is set to be updated each time has been updated and obtains the item value to be synchronized corresponding to a difference between a master database that resides on the external authentication apparatus and the local database.

4. The authentication apparatus as claimed in claim 3, wherein
   the external authentication apparatus acts as a master authentication server and the authentication apparatus acts as an intermediate-layer authentication server.

5. An authentication method of an authentication apparatus authenticating an information processing apparatus in cooperation with an external authentication apparatus, the authentication method comprising:
   responding to a request from the information processing apparatus to carry out authentication and obtain item values and carrying out authentication for a required account;
   responding to the authentication being carried out and obtaining from the external authentication apparatus an item value corresponding to an item name that is set as an item to be synchronized each time;
   updating an item value included in a local database by the obtained item value corresponding to the item name that is set as an item to be synchronized each time;
   obtaining a set of item values including the updated item value;
   returning to the information processing apparatus a result of the authentication and the obtained set of item values;
   obtaining from the external authentication apparatus an item value corresponding to an item name that is set to be synchronized according to a schedule; and
   updating an item value included in the local database by the item value obtained by the obtaining of the item value corresponding to the item name,
   wherein:
   the set of item values which has been obtained further includes the item value updated by the updating of the item value, and
   one or more priorities are set to the items to be synchronized according to the schedule, and synchronization processes of the items to be synchronized according to the schedule are carried out periodically at one or more updating intervals that are set according to the one or more priorities, respectively.

6. A non-transitory information recording medium storing a program which, when executed by one or more processors, realizes an authentication apparatus that authenticates an information processing apparatus in cooperation with an external authentication apparatus, the program causing the one or more processors to act as:
   an authentication part that responds to a request from the information processing apparatus to carry out authentication and obtain item values and carries out authentication for a required account;
   an each-time item value obtaining part that responds to the authentication being carried out and obtains from the external authentication apparatus an item value corresponding to an item name that is set as an item to be synchronized each time;

an each-time item value updating part that updates an item value included in a local database by the item value obtained by the each-time item value obtaining part;

an item value set obtaining part that obtains a set of item values including the item value updated by the each-time item value updating part;

a returning part that returns to the information processing apparatus an authentication result obtained from the authentication part and the set of item values obtained by the item value set obtaining part;

a scheduled item value obtaining part that obtains from the external authentication apparatus an item value corresponding to an item name that is set to be synchronized according to a schedule; and a scheduled item value updating part that updates an item value included in the local database by the item value obtained by the scheduled item value obtaining part, wherein:

the set of item values which has been obtained further includes the item value updated by the updating of the item value, and one or more priorities are set to the items to be synchronized according to the schedule, and synchronization processes of the items to be synchronized according to the schedule are carried out periodically at one or more updating intervals that are set according to the one or more priorities, respectively.

7. The non-transitory information recording medium as claimed in claim 6, the program causing the one or more processors to further act as:

a scheduled item value obtaining part that obtains from the external authentication apparatus an item value corresponding to an item name that is set to be synchronized according to a schedule; and a scheduled item value updating part that updates an item value included in the local database by the item value obtained by the scheduled item value obtaining part, wherein the set of item values obtained by the item value set obtaining part further include the item value updated by the scheduled item value updating part.

* * * * *